US006772952B1

(12) United States Patent
Macaire

(10) Patent No.: US 6,772,952 B1
(45) Date of Patent: Aug. 10, 2004

(54) METHOD FOR ORGANISING A CHIP CARD SO THAT IT CAN BE USED AS A SERVER IN AN INTERNET-TYPE NETWORK

(75) Inventor: Alain Macaire, Marseille (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/743,318

(22) PCT Filed: Jun. 24, 1999

(86) PCT No.: PCT/FR99/01517

§ 371 (c)(1),
(2), (4) Date: Jan. 9, 2001

(87) PCT Pub. No.: WO00/03363

PCT Pub. Date: Jan. 20, 2000

(30) Foreign Application Priority Data

Jul. 10, 1998 (FR) .............................. 98 08950

(51) Int. Cl.[7] .............................................. G06K 19/06
(52) U.S. Cl. ........................................ 235/492; 235/380
(58) Field of Search ................................ 235/487, 492, 235/451, 379, 380; 455/550–558

(56) References Cited

U.S. PATENT DOCUMENTS 6,405,049 B2 * 6/2002 Herrod et al. .............. 455/517
6,434,405 B1 * 8/2002 Sashihara ................... 455/557
6,481,621 B1 * 11/2002 Herrendoerfer et al. .... 235/380

FOREIGN PATENT DOCUMENTS

| WO | WO97/06627 | 2/1997 |
| WO | WO97/45814 | 12/1997 |
| WO | WO98/10382 | 3/1998 |
| WO | WO98/20411 | 5/1998 |

* cited by examiner

Primary Examiner—Michael G. Lee
Assistant Examiner—Jamara A. Franklin
(74) Attorney, Agent, or Firm—Burns, Doane, Swecker & Mathis, LLP

(57) ABSTRACT

Chip cards, or smart cards, are used as servers in association with a digital data transmission network terminal. The chip card comprises a microprocessor and memories which contain programs and data for interpreting the URL's coming from a network terminal, translating them into elementary commands of the chip card and formatting a response to the terminal. Some of these functions can be performed by the terminal with which the chip card is associated. The invention is applicable to networks transmitting digital data and programs of the Internet or mobile telephone system type.

11 Claims, 2 Drawing Sheets

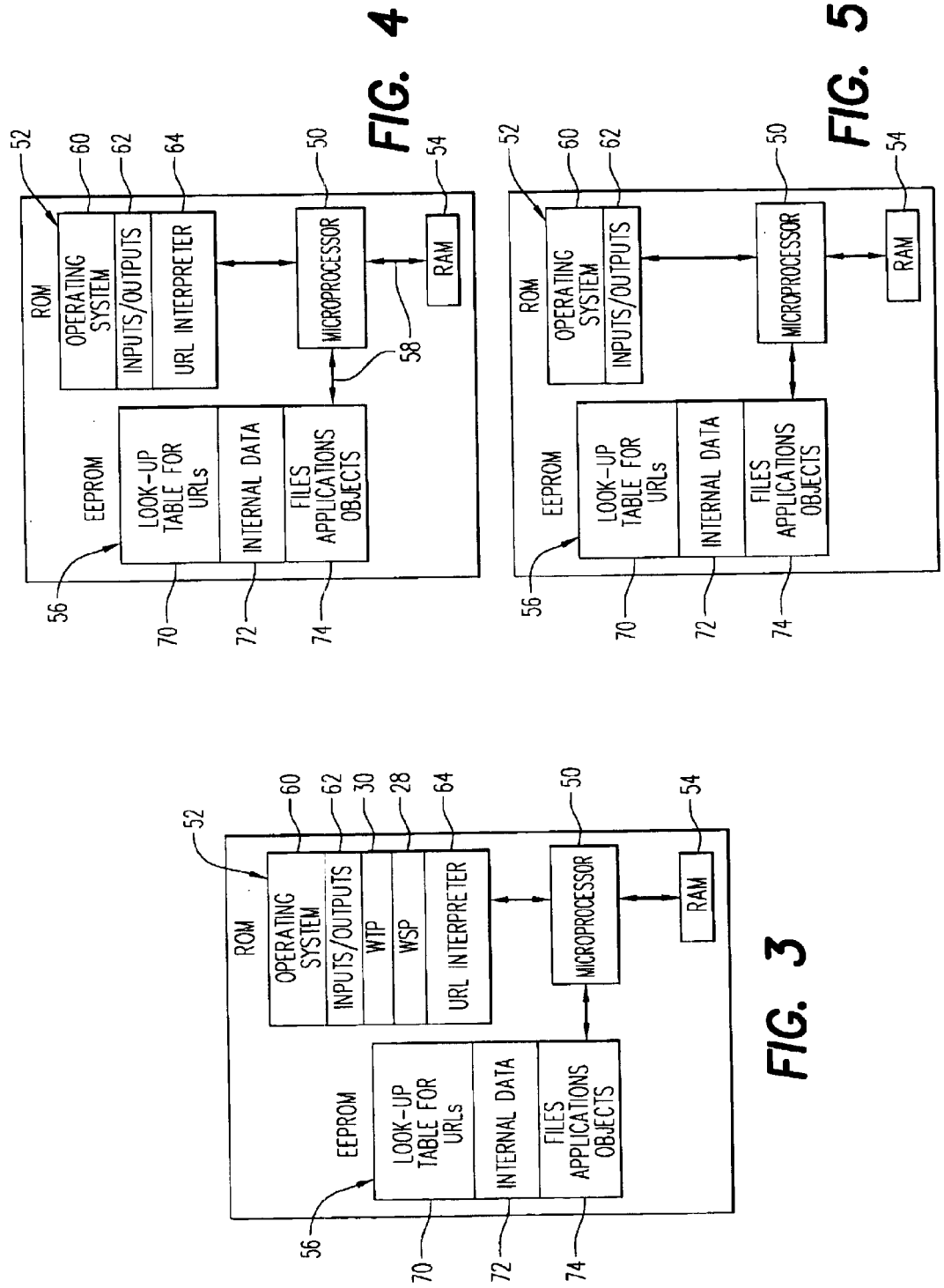

METHOD FOR ORGANISING A CHIP CARD SO THAT IT CAN BE USED AS A SERVER IN AN INTERNET-TYPE NETWORK

This disclosure is based upon, and claims priority from, French Application No. 98/08950, filed Jul. 10, 1998, and International Application On. PCT/FR99/01517, filed Jun. 24, 1999, and published by the International Bureau on Jan. 20, 2000 in a language other than English, the contents of which are incorporated herein by reference.

The invention relates to electronic chip cards and, more particularly, in such cards, organisation systems which make it possible to configure them with a view to using them as servers of the type used in the network known as the Internet.

Electronic chip cards are being more and more widely used for performing various functions in relation to equipment such as computers for personal use, mobile telephone handsets, banking terminals, etc. To this end, they are configured as electronic circuits and software for communicating with the equipment with which they are connected in accordance with communication protocols which are relatively simple and are defined by ISO 7816-3/4.

These communication protocols do not make it possible to access the, electronic chip card in a network of the Internet type using the addressing method utilised in such a network for access locally or at a distance to all types of application (texts, images, sound, voice, files etc)

The current organisation of electronic chip cards and the communication protocols which they use do not therefore make it possible to use them as servers of the type used in the Internet.

One aim of the invention is therefore to produce an electronic chip card which can be used as a server in a network of the Internet type through a terminal adapted for accessing this network.

To achieve this aim, the invention proposes systems for organising electronic chip cards which enable any user of the network to which it is connected to communicate with it in accordance with a common and universal addressing language.

In order to simplify the reading of the description and claims, the acronyms defined below will be used as substantive:

URL is the acronym of the English expression "Uniform Resource Locator" and defines a means for locating and naming a resource (file, text, sounds, images, application, program or data table and generally referred to ask an "object") available on a server, in the field of the Internet. There exist several URL access schemes which each correspond to an access protocol, for example "http://" and "ftp://" which allow distant access via a network, or "file://" which allows access to a local file system.

WWW is the acronym of the English expression "World Wide Web" and defines the world-wide network of information and services of the Internet.

WAP is the acronym of the English expression "Wireless Application Protocols" and defines a set of protocols of the wireless telephony network enabling mobile terminals to connect to and access the information and servers of the Internet.

HTML is the acronym of the English expression "Hyper-Text Markup Language" and defines a language for defining the structure and display of the document or file as well as the elements for browsing within the WWW network.

HTTP is the acronym of the English expression "Hyper-Text Transfer Protocol" and defines the communication protocol of the WWW network making it possible notably to recover the resources available on the WWW network.

WSP is the acronym of the English expression "Wireless Session Protocol" and defines a WAP protocol layer equivalent to the HTTP protocol.

TLS is the acronym of the English expression "Transport Layer Security" and defines the protocol relating to the determination of the security parameters and algorithms in order to establish a protected session between a client terminal and a server.

WTLS is the acronym of the English expression "Wireless Transport Layer Security" and defines the TLS protocol transposed to wireless telephony in all the WAP protocols.

TCP/IP is the acronym of the English expression "Transmission Control Protocol/Internet Protocol" and defines a protocol layer of the communication level used in the Internet which manages the addressing and routing of the data packets in the network.

WTP is the acronym of the English expression "Wireless Transport Protocol" and defines a WAP protocol layer equivalent to the TCP/IP protocol on the Internet.

WML is the acronym of the English expression "Wireless Markup Language" and defines an HTML language simplified for the WAP protocol.

WAE is the acronym of the English expression "Wireless Application Environment" and defines the application environment of the client terminal, that is to say the client browser, in the WAP protocol for access to the services of the Internet.

WTA is the acronym of the English expression "Wireless Telephony Application" and defines an application environment of the client terminal in the WAP protocol for the telephony services.

CGI is the acronym of the English expression "Common Gateway Interface" and defines an interface for access to the applications of the WWW. This interface makes it possible to activate applications on the WWW servers using a URL request sent from a client browser. This interface supports the passage of input parameters to the applications.

APDU is the acronym of the English expression "Application Protocol Data Unit" and defines an elementary exchange format for commands between an application on a terminal and an application on a chip card. It is a case for example of the ISO 7816-4 standard.

SQL is the acronym of the English expression "Structured Query Language" and defines the language used in the interrogation of relational databases.

SCQL is the acronym of the English expression "Structured Card Query Language" and defines the query language for a chip card of the database type, in accordance with ISO 7816-7. SCQL is the equivalent in chip cards of the SQL language used in the interrogation of relational databases.

BNF is the acronym of the English expression "Backus-Naur Form" and defines a symbolic pseudocode for defining syntactical rules of a language and a grammar.

GSM is the acronym of the English expression "Global System for Mobiles" and designates a mobile telephony system.

SUMMARY OF THE INVENTION

The invention therefore relates to a system for organising an electronic chip card with a view to its use as a server by means of a terminal to which it is connected in a digital data transmission network such as the Internet, the electronic chip card comprising a microprocessor, and memories containing programs and data for implementing the operating system of the electronic chip card and for managing the inputs/outputs of the electronic chip card, characterised in that it also comprises:

means for translating the commands coming from the terminal into elementary commands of the electronic chip card, means for performing the operations defined by the elementary commands, and means for formatting the response from the electronic chip card to the terminal.

The means for translating the URL commands comprise a look-up table recorded in one of the memories.

In a variant, the electronic chip cards also comprise means for implementing session (WSP) and transmission (WTP) protocols.

BRIEF DESCRIPTION OF THE DRAWINGS

Other characteristics and advantages of the sent invention will emerge from a reading of the following description of particular example embodiments, the said description being given in relation to the accompanying drawings, in which:

FIG. 3 is a first example of organisation of a server chip card according to the invention in which all the protocol layers are implemented in the server chip card;

FIG. 4 is a second example of organisation of a server chip card according to the invention in which the protocol layers exist only in the terminal to which the server chip card is connected, and FIG. 5 is a third example of organisation of a server chip card according to the invention in which the URL interpreter is transferred to the terminal to which the server chip card is connected.

DETAILED DESCRIPTION

Figure 1:
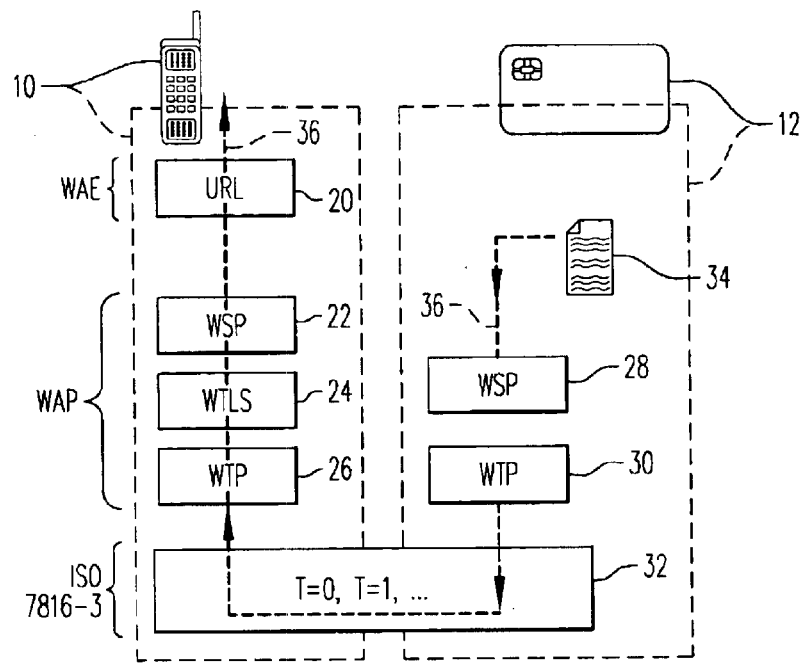
FIG. 1 is a diagram showing, in terms of protocol layers, local access of a chip card used as a server in a network of the Internet type through a local terminal adapted for accessing this network.

The definitions of the acronyms given in the preamble form part of the description.

The diagrams in FIGS. 1 to 5 will be described in the context of a mobile telephony network of the GSM type in which a client or a user of the network has a handset or terminal 10 wishing to access a server chip card 12 situated locally to the terminal 10 (FIG. 1) or at a distance (FIG. 2) by means of a relay terminal 16.

In order to access the services of the Internet, the client terminal 10 has recourse to different protocols, disposed in superimposed layers, through the URL addressing mode (2). These protocols in general consist respectively of a session layer (22), a security layer (24) and a transport layer (26). These layers define for example the protocols respectively of the WAP, WSP, WTLS and WTP type.

The server chip card 12 comprises the WSP protocol (reference 2) and the WTP protocol (reference 30).

In the case in FIG. 1, the client terminal 10 and server chip card 12 communicate directly through the communication protocols 32 such as ISO 7816-3 in accordance with modes T=0 and T=1. This organisation enables the client terminal 10 to recover a file 34 of the server chip card 12 in accordance with the direction of the arrows 36. It also makes it possible to transfer one file or other from the terminal 10 to the chip card 12 in the opposite direction to the arrows 36, for example in order to update the server chip card 12.

Figure 2:
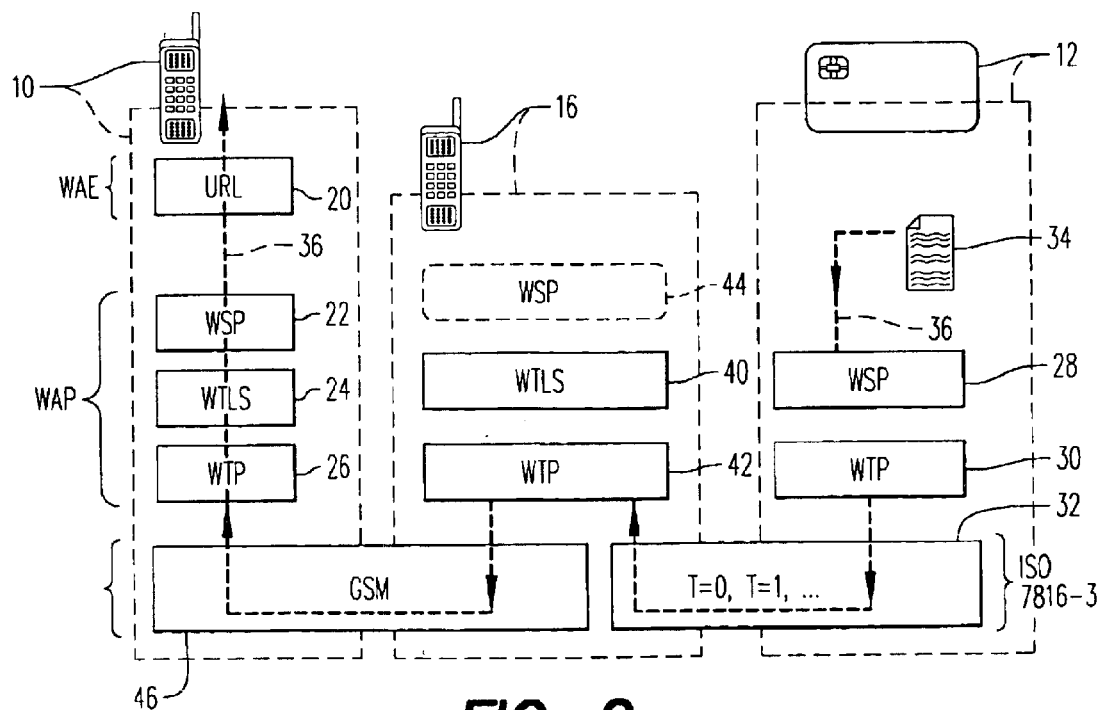
FIG. 2 is a diagram showing, in terms of protocol layers, the remote access of a chip card used as a server in a network of the Internet type through a local network adapted for accessing this network.

In the diagram in FIG. 2, the server card is not connected locally to the client terminal 10 but through a relay terminal 16 which comprises at least the WTP protocol (reference 42) and possibly the WTLS protocol (reference 40) in the case of a protected connection. It should be noted that the WSP protocol (reference 44) is not necessary in the relay terminal 16.

The server chip card 12 communicates locally with the terminal 16 by means of the communication protocols 32 whilst the said terminal communicates with the client terminal 10 by means of transmission protocols 46 of the type used for mobile telephony (GSM).

This organisation in FIG. 2 enables the client terminal 10 to read the file 34 of the server chip card by means of the relay terminal 16 via the communication protocols 32 and 46 in the direction of the arrows 36. It also makes it possible to transfer one file or other from the terminal 10 to the chip card 12 in the opposite direction to the arrows 36, for example in order to update the server chip card 12.

The description of FIGS. 1 and 2 shows that the server chip card 12 implements the WSP and WTP protocols, which can be implemented by the relay terminal.

The chip card 12 should at least fulfil the following functions:

translate the URL commands into the sequence of elementary commands for the chip card, select the file requested and return it to the client terminal 10, or initiate the associated processing, and format the response of the chip card to the is client terminal.

The invention proposes three example embodiments of the server chip card according to the degree of integration of the WTP and WSP protocols in the chip card 12.

These embodiments include Example (a) (FIG. 3) in which the WTP and WSP protocols and the URL interpreter are implemented by the chip cards;

Or Example (b) (FIG. 4) in which only the URL interpreter is implemented in the chip card, the WTP and WSP protocols being implemented by the terminal with which the chip card is associated;

Or Example (c) (FIG. 5) in which all the WTP and WSP protocols and the URL interpreter are implemented by the terminal with which the chip card is associated.

Whatever the particular example embodiment of the server chip card according to the invention, this will comprise:

a microprocessor 50, a so-called program memory 52, of the non-volatile read only type, more commonly known under the acronym ROM, standing for the English expression "Read Only Memory", which contains the programs, a memory 54 of the volatile random access type, more usually known by the acronym RAM, standing for the English expression "Random Access Memory", and a so-called data memory 56, of the programmable and erasable type, more usually known under the acronym EEPROM, standing for the English expression "Electrically Erasable Programmable Read Only Memory", which contains the data.

The arrows 58 indicate that the microprocessor 50 communicates with the memories 52, 54 and 56.

The differences between the three example embodiments relates to the content of the memory 52. This is because in Example (a) (FIG. 3), the chip card contains:

the operating system 60 of the chip card,
the input/output management system 62,
the WTP protocol (reference 30),
the WSP protocol (reference 28), and
the URL interpreter 64.

In this Example (a), the chip card 12 fulfils all the WTP, WSP and URL interpreter functions, which entails a memory 52 of large capacity.

In Example (b) (FIG. 4), it contains:

the operating system 60 of the chip card,
the input/output management system 62, and
the URL interpreter 64.

In this Example (b), the WTP and WSP protocols are installed on the relay terminal 16 with which the server chip card is associated.

In order to communicate with the URL interpreter 64 disposed on the chip card 12, the relay terminal 16 is designed to produce so-called "envelope" commands which convey the URL from the relay terminal to the card.

In Example (c) (FIG. 5), it contains:

the operating system 60, and
the input/output management system 62.

In this Example (c), the WTP and WSP protocols and the URL interpreter are installed on the relay terminal 16 with which the server chip card is associated. When the relay terminal 16 is started up, the latter sends, for example, a command for transferring the content of the look-up table for the URLs.

In the three example embodiments, the memory 56 contains the same elements, which are:

the look-up table 70 for the URLs,
the data 72, internal to the chip card, and
the files, applications and objects (reference 74).

The generic URL access scheme is defined in the document RFC 1738 of December 1998, accessible on the Internet, the authors of which are T. Berners-Lee, L. Masinter and M. McCahill according to the following model:

<scheme>://<user>:<password>@<host><port>/<url-path>

The invention proposes a scheme for access to the server chip card according to:

card://<accesscondition>@<host>:<cardreader>/url-parmlist

In this scheme, the protocol for access to the server chip card as a resource is identified by "card://".

The conditions for access to the card, such as the personal code or the cryptographic certificate, are for example defined by the "access condition" part.

The terminal concerned, to which the server chip card is connected, is identified by the part "host".

The card reader concerned is identified by the part "cardreader" and may correspond to a physical address of the reader or a logic address such as the SIM reader of mobile telephony terminals.

The access path to the resource is identified by the part "url-path" and can correspond either to a logic path from the root of the chip card, or-a logic path to a file or an application.

In the case of a command of the application type, the part "parmlist" will indicate all the parameters intended for this application.

A complete summary of the URL addressing scheme for the server chip card "card://" is defined using the BNF notation and is as below:

```
cardurl: =           "card://"
[[accesscondition"@]host
  [":"cardreader] ["/"path["?"parmlist]]
  accesscondition: = [[user]][":"pincode]]
  host: =            "localhost" | hostname
  cardreader: =      "SIM" | "OPT"
  path: =            application"/"command
  parmlist: =        * parm ["+"parm]
  parm: =            * [char]
  application: =     *[char] | efdf"/"efdf]
  command: =         *efdf | [char]
  user: =            *[char]
  hostname: =        [char]
  pincode: =         digitdigitdigitdigit
  efdf: =            "S"-hex-hex-hex-hex
  char: =            alpha | digit
  alpha: =           lowalpha | hialpha
  hex: =             digit
|"A"|"B"|"C"|"D"|"E"|"F"|
                     ["a"|"b"|"c"|"d"|"e"|"f"
digit: =
"0"|"1"|"2"|"3"|"4"|"5"|"6"|"7"|"8"|"9"
lowalpha: =
"a"|"b"|"c"|"d"|"e"|"f"|"g"|"h"|"i"|"j"|"k"|
"l"|"m"|"n"|"o"|"p"|"q"|"r"|"s"|"t"|"u"|"v"|
                     "w"|"x"|"y"|"z"
hialpha: =
"A"|"B"|"C"|"D"|"E"|"F"|"G"|"H"|"I"|"J"|"K"|
"L"|"M"|"N"|"O"|"P"|"Q"|"R"|"S"|"T"|
                     "U"|"V"|"W"|"X"|"Y"|"Z"
```

What is claimed is:

1. An electronic chip card that functions as a server by means of a terminal in a digital data transmission network, said electronic chip card comprising:

a microprocessor, memories containg programs and data for implementing an operating system of the electronic chip card for managing inputs/outputs of the electronic chip card, means for translating commands from the terminal into elementary commands of the electronic chip card, means for performing operations defined by the elementary commands, and means for formatting a response from the electronic chip card to the terminal.

2. An electronic chip card according to claim 1, wherein said means for translating the commands comprise a look-up table for URLs which is specific to each type of chip card.

3. An electronic chip card according to claim 2, wherein said means for translating the commands further comprise a URL interpreter program recorded in one of said memories.

4. The electronic chip card of claim 1, wherein said chip card communicates with the terminal by means of a protocol that conforms to an international standard for integrated circuit cards.

5. The electronic card of claim 1, wherein said chip card communicates with the terminal by means of commands that conform to the APDU format.

6. The electronic chip card of claim 1, wherein the terminal comprises a mobile telephone handset.

7. An electronic chip card that functions as a server by means of a terminal in a digital data transmission network, said electronic chip card comprising:

a microprocessor, memories containing programs and data for implementing an operating system of the electronic chip card for managing inputs/outputs of the electronic chip card, means for translating commands from the terminal into elementary commands of the electronic chip card, means for performing operations defined by the elementary commands, means for formatting a response from the electronic chip card to the terminal, and means for implementing session and transmission protocols.

8. An electronic chip card according to claim 7, wherein said means for implementing the session and transmission protocols comprise programs recorded in one of said memories.

9. The electronic chip card of claim 7, wherein said session protocol comprises WSP.

10. The electronic chip card of claim 9, wherein said transmission protocol comprises WTP.

11. The electronic chip card of claim 7, wherein said transmission protocol comprises WTP.

\* \* \* \* \*